(12) United States Patent
Yamada et al.

(10) Patent No.: US 6,192,293 B1
(45) Date of Patent: Feb. 20, 2001

(54) SYSTEM FOR MESHING CURVED SURFACE BY GENERATING AND CONTROLLING THE NUMBER OF BUBBLES IN PARAMETRIC SPACE

(75) Inventors: Atsushi Yamada, Yokohama; Keisuke Inoue, Sagamihara; Takayuki Ito, Kawasaki; Tomotake Furuhata, Yokohama, all of (JP)

(73) Assignee: International Business Machines Corporation, Armonk, NY (US)

(*) Notice: Under 35 U.S.C. 154(b), the term of this patent shall be extended for 0 days.

(21) Appl. No.: 09/078,827

(22) Filed: May 14, 1998

(30) Foreign Application Priority Data

May 14, 1997 (JP) ..................................... 9-124458

(51) Int. Cl.[7] ..................................... G06F 19/00
(52) U.S. Cl. .................... 700/182; 700/169; 700/118; 700/187; 382/203
(58) Field of Search .................... 700/182, 159, 700/169, 83, 118, 187, 260; 382/203; 710/29, 30

(56) References Cited

PUBLICATIONS

Shimada et al.—"Bubble Mesh: Automated Triangular Meshing of Non–Manifold Geometry by Sphere Packing"—May 1995—p. 409–419.*

Delingette et al.–"A Spherical Representing for the Recognition of Curved Objects"—May 1993—p. 103–112.*

Glanvill et al. —"Curve and Surface Reconstruction in R2 and R3"—May 1997—p. 395–400.*

* cited by examiner

Primary Examiner—Thomas C. Lee
Assistant Examiner—Thuan Du
(74) Attorney, Agent, or Firm—Ronald L. Drumheller

(57) ABSTRACT

A curved surface to be meshed and a tensor at each point on the curved surface are inputted. Then, bubbles are generated in parametric space corresponding to the curved surface and in accordance with tensors transformed according to the relationship between the curved surface and parametric space. Following this, the bubbles are moved in parametric space by inter-bubble force defined by a predetermined rule, and are transformed by using the transformed tensors. The number of the bubbles is also controlled, so that stable locations for the bubbles in parametric space can be determined. Next, a connection relationship between mesh nodes, which are centers of the bubbles located in parametric space, is determined in parametric space. Finally, a mesh is generated on the curved surface by employing the positions and the connection relationship of the mesh nodes.

16 Claims, 8 Drawing Sheets

SYSTEM FOR MESHING CURVED SURFACE BY GENERATING AND CONTROLLING THE NUMBER OF BUBBLES IN PARAMETRIC SPACE

BACKGROUND OF THE INVENTION

1. Field of the Invention

The present invention relates to a technique for meshing a curved surface that is employed in the fields of analysis of computational dynamics (CAE), NC machining (CAM), building of a three-dimensional shape (CAD), and computer graphics (CG).

2. Related Art

The technique for meshing a curved surface, which divides into a set of triangles a curved surface including a curved shape defined by a parametric curved surface expression, such as a Bezier surface patch or NURBS, has been very important for the above described fields. For example, in the CAE field, the meshing technique is employed for a finite-element method performed by a computer, such as the analysis of a car collision, and in the CAM field, the meshing technique is employed when shaving a curved shape using an NC machine. In the CAD field, the meshing technique is employed for a case wherein a three-dimensional shape is expressed as a set of triangles and a more detailed shape is to be built by repeating the deformation while expending minimum energy. In the CG field, the meshing technique is employed to display a curved surface.

Various methods are employed for meshing a curved surface, and a method that satisfies the following conditions is required.

(1) A trimmed curved surface can be a target for meshing. A trimmed curved surface is a curved shape that is obtained by extracting one necessary part from a curved domain having a triangular or square boundary, such as a Bezier surface patch or NURBS. A shape that has an inside hole is also a trimmed curved surface. Many curved shapes designed by using CAD system are expressed by trimmed curved surfaces, and it is very advantageous to be able to generate meshes relative to a trimmed curved surface.

(2) A complicated curved shape can be processed. It is important to be able to handle a very winding curved shape and a curved shape where two points that are separated by a long interval in parametric space exist close in real space. As a rare case, a self-intersecting curved shape is one example.

(3) Distribution of the sizes of generated elements can be controlled. It is also important that small mesh elements can be generated in an important portion on a curved surface and that large mesh elements can be generated in a portion that is not so important, and that mesh elements that have a distribution in accordance with the curvature of a curved surface can be generated.

(4) A triangular element having a designated shape can be generated. Frequently, required mesh elements have triangular shapes. The triangular shape must be as close to an equilateral triangle as possible. This is because, as well known, when a finite-element analysis method is performed using a mesh that includes extremely distorted elements, it has an adverse effect. Since sometimes an elongated triangle is required, it is also important that a triangle (and/or a square) that is similar to a designated shape can be generated.

(5) The processing should be automatically performed. Although there is a manual meshing method, a desirable method is one for which a pre-process is not required and with which a mesh can be automatically provided by merely inputting the shape type and the mesh distribution.

As a mesh generation method that satisfies the conditions (3) and (5) for a flat surface domain instead of a curved surface, there is a bubble meshing method ("Automatic Mesh Division Using Physical Model," Kenji Shimada, Japanese Simulation Institute, vol. 12, No. 1, 1993, pp. 11–20). The bubble meshing method is a mesh generation method that employs an optimal allocation of mesh nodes, which is obtained by a dynamic calculation, and Delaunay triangular division. An example where the bubble meshing method is applied for a curved surface has been reported ("Comparison of Discretization Algorithms for NURBS Surfaces with Application to Numerically Controlled Machining," S. P. Austin, R. B. Jerard and R. L. Drysdale, Computer Aided Design, Vol. 29, No. 1, 1997, pp. 71–83). In this paper, although the distribution of parameters is not uniform in a normal curved shape, normal Delaunay triangular division is performed in parametric space. As a result, a preferable mesh (mesh that can satisfy the condition (4)) can not be generated on a curved surface in real space. Another paper ("Most Tightly Packing in Sphere and Automatic Triangular Mesh Division of Curved Surface by Delaunay Net," Kenji Shimada, 67th Graphics and CAD Research in Information Processing Institute, 1994, pp. 11–20) describes the movement of a circular or spherical bubble to the optimal position on a curved surface and the adaptive controlling of the number of bubbles on a curved surface. In this paper, since a process for moving a bubble to an optimal position on a curved surface is performed, a process for restricting to a curved surface a bubble whose optimal position is apart from a curved surface because of inter-bubble force is required. In addition, a process concerning three-dimensional space is also required. In the above paper, the previously mentioned condition (4) is not taken into account.

Further, an example for generating an anisotropic mesh having a specific direction has been reported ((1) "Automatic Generation Method For Anisotropic Mesh," Kenji Shimada, 51st (later half of 1997) National Assembly Of Information Processing Institute, 4C-7, 1995; (2) "A Pliant Method For Anisotropic Mesh Generation," F. J. Bossen, P. S. Heckbert, Proceeding of 5th International Meshing Roundrable '96, October 1996, pp. 63–74). According to this method, a vector field indicating a direction and a scalar field indicating the size of a bubble are provided instead of a circular bubble to generate an elliptic bubble, and thus a mesh having a direction is generated. Only a flat surface is described in these papers, and accordingly, no explanation was given for parametric space.

Japanese Unexamined Patent Publication No. Hei 8-315183 describes the filling of a curved surface with the above described elliptic bubble, and suggests the employment of parametric space. In this publication, however, parametric space is employed only to locate first bubbles on a curved surface in real space, and the following process is performed at the curved surface in real space. Since in this publication, as well as for the above paper, a process is performed to move an elliptic bubble to an optimal position on the curved surface, a process is required for restricting to the curved surface, a bubble whose optimal position is outside the curved surface because of internal-bubble force. In addition, a process for three-dimensional space is required. In this publication, it is not obvious that condition (2) is satisfied.

In addition to the above conventional techniques, there are the following techniques.

(a) Method for generating a grid in parametric space is described in "Finite element Mesh Generation Method: A Review And Classification," K. Ho-Le, Computer Aided Designing, Vol. 20, No. 1, 1988, pp. 27–38.

According to this method, a trimmed surface is divided in advance into domains having three sides or four sides, manually or by a specific method, and the domains are divided into grids. Many business analysis software programs employ this method for an associated mesher, but this method does not satisfy the previous mentioned condition (5). Supposing that the mesh generation is performed for all the parts of a single machine, such as a plane or a car, the manual labor required will be enormous. In addition, since the division of domains differs depending on the persons, the resultant meshes are varied depending on the operator. Another problem with the method is the difficulty involved in controlling the size of the mesh elements.

(b) A method using quad-trees is described in: (1) "Comparison Of Discretization Algorithms For NURBS Surfaces With Application To Numerically Controlled Machining," S. P. Austin, R. B. Jerard and R. L. Drysdale, Computer Aided Design, Vol. 29, No. 1, 1997, pp. 71–83; (2) "A Free-Form Mesh Generation For Three-Dimensional Surfaces," T. Hua and I. Zeid, Advances In Design Automation, DE-Col. 65-2, Vol. 2, ASME 1993, pp. 525–534; and (3) "Triangulation Of Trimmed Surfaces In Parametric Space," X. Sheng and B. E. Hirsch, Computer Aided Design, Vol. 24, No. 8, 1992, pp. 437 to 444.

This method recursively divides parametric space into quad-trees. For a trimmed surface, a problem exists in generating a mesh element that is distorted in the vicinity of a border. In particular, in finite element analysis a distorted element that is located at a border of domains would adversely affect the accuracy of an analysis. In addition, a problem with this method is that, even inside the domain, a distorted mesh is generated at a portion at which the number of stages of the quad-trees is changed.

(c) A method for performing triangular mesh generation in real space by using a condition similar to Delaunay conditions is described in (1) "Surface Modeling With Oriented Particle System," R. Szeliski and D. Tonnesen, Computer Graphics, Vol. 26, No. 2, 1992, pp. 185–194; and (2) "Guaranteed-Quality Mesh Generation For Curved Surfaces," L. P. Chew, ACM Symposium On Computational Geometry, 1993, pp. 274–280.

For this method, the condition "consider a sphere that is circumscribed with three mesh nodes on a curved surface and that has its center on the curved surface, and the other mesh nodes are not included inside the sphere" is employed instead of the Delaunay condition "no mesh nodes are included inside a circle that is circumscribed along three mesh nodes on a flat surface." With this method, however, when a curved shape is provided wherein two points are near each other in real space while they are separated by a long interval in parametric space, a mesh that runs the shortest distance in real space is generated, so that mesh generation fails completely. The same problem is also described in "Re-tiling Polygonal Surfaces," T. Turk, Computer Graphics, Vol. 26, No. 2, 1992, pp. 55–64.

(d) A three-dimensional Mesh is described in "Bounded Aspect Ratio Triangulation of Smooth Solids," D. Moore and J. Warren, Symposium On Solid Modeling And Applications, 1991, pp. 455–464.

According to this method, a tetrahedron mesh is generated in a condition where mesh nodes are generated on a curved shape, and finally, mesh nodes other than those on the curved surface are deleted. The division of three-dimensional space into tetrahedrons is not practical, however, because the calculation time is drastically increased compared with that required for triangular division. It is not easy to perform division of tetrahedrons so as to provide a distribution where mesh elements on the curved surface have prescribed sizes.

As described above, there are no conventional methods that satisfy the five previously described conditions.

SUMMARY OF THE INVENTION

It is an object of the present invention to provide a method that can satisfy the five conditions described above.

According to a method of the present invention for meshing a curved surface, first, a curved surface to be meshed and a tensor at each point on the curved surface are input. Then, bubbles are generated in parametric space corresponding to the curved surface. Each of the bubbles corresponds to the tensor transformed according to the relationship between the curved surface and the parametric space. That is, "transformed tensor" is calculated by transforming the input tensor, and bubbles represented by the tensors are generated. The shapes of the bubbles are determined by the values of the "transformed tensors." Following this, by moving the bubbles in the parametric space by inter-bubble force defined by a predetermined rule, and transforming the bubbles by using the transformed tensors and controlling the number of the bubbles, stable allocation for the bubbles in the parametric space is determined. Next, a connection relationship between mesh nodes, which are centers of the bubbles located in the parametric space, is determined in parametric space. Finally, a mesh is generated on the curved surface by employing the positions and the connection relationship of the mesh nodes. As described above, initial bubbles are generated in parametric space, and the following process is also performed in parametric space, so that, unlike the conventional method, a curved surface having a complicated shape can be handled (condition (2)). A mesh can be generated for a field that is designated by tensors (condition (4)). In addition, anything other than the input curved surface and tensor data can be automatically executed (condition (5)). Accordingly, the size of a mesh element to be generated can be controlled by input tensors (condition (3)), and a curved surface includes a trimmed curved surface (condition (1)). Furthermore, since the parametric operation is performed in two-dimensional parametric space, the processing is simplified compared with the conventional technique that requires the process be performed in three-dimensional space.

The process for determining the stable allocation for the bubbles in parametric space may include a process for calculating a force exerted by an adjacent bubble to a first bubble wherein the force is defined by a predetermined rule, and for moving the first bubble in parametric space in accordance with a sum of the force exerted by the adjacent bubbles, and for generating a second bubble that corresponds to a tensor at position after the first bubble is moved, wherein the tensor is transformed in accordance with the relationship between the curved surface and parametric space. A process for re-generating bubbles after they have been moved corresponds to a transformation of the bubbles. This transformation is performed to adjust the shape of bubbles to the tensor field that is provided at first.

The process for determining the stable allocation may include the steps of: generating a new bubble between the bubbles on the parametric space when there is a large enough gap between the bubbles to satisfy a first predetermined condition, and eliminating a first bubble when the first bubble and a second bubble are so close that a second predetermined condition is satisfied. With this process, the number of bubbles can be adaptively controlled.

In the process for determining the connection relationship of the mesh nodes in parametric space, first, four adjacent bubbles are selected. Then, a bubble is generated, which corresponds to a tensor transformed in accordance with the relationship between the curved surface and parametric space at barycenters of four centers of the four bubbles. Then, parametric space is transformed so that the generated bubble becomes a circle, and the positions of the centers of the four bubbles in parametric space are calculated. Finally, the positions of the centers of the four bubbles in transformed parametric space are employed to determine how the four centers of the four bubbles are connected. In this process, although anisotropic mesh is generated in parametric space, as previously described, the mesh generated in parametric space are mapped to a curved surface in real space, so that the mesh can acquire an adequate shape on the curved surface in real space.

The process for determining the connection relationship between the mesh nodes in parametric space may be required for the previously described process for determining the stable allocation of the bubbles. For example, while adaptive control for a number of bubbles is provided, the above process is required in a case where a new bubble is generated between the bubbles when a ratio of a length of a side connecting the centers of the bubbles to a sum of the radii of bubbles located at both ends of the side is equal to or less than a first predetermined value, and wherein a bubble at either end of the side is eliminated when the ratio is equal to or greater than a second predetermined value.

It would be easy for one having ordinary skill in the art who understood the below explanation to prepare a program that allows a computer to execute the above process. Further, it would be obvious to one having ordinary skill in the art that a program for causing a computer to execute the above process can be stored in a storage medium.

DESCRIPTION OF THE PREFERRED EMBODIMENTS

Figure 1:
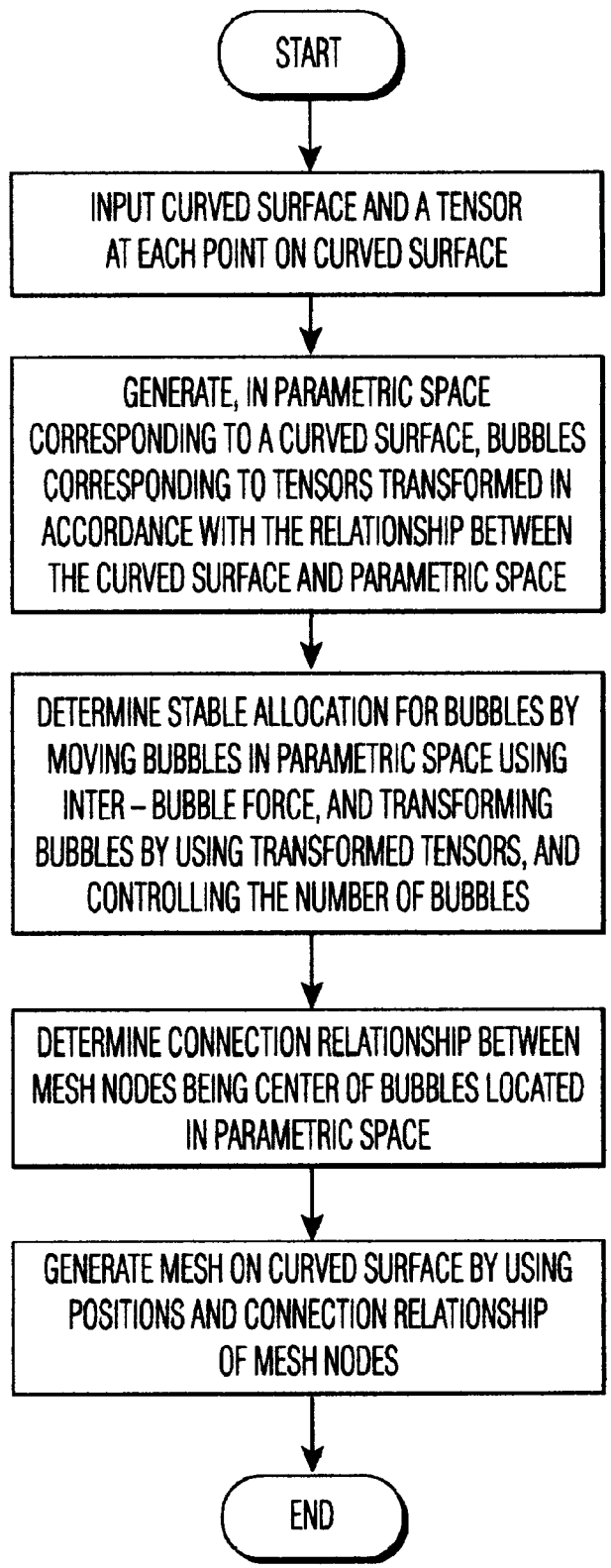
FIG. 1 is a flowchart showing all the processing for the present invention.

An explanation will now be given for each of the steps that are described in the Summary explanation: (1) a step of inputting a curved surface to be meshed and a tensor at each point on the curved surface; (2) a step of generating in parametric space corresponding to the curved surface bubbles that correspond to tensors transformed according to a relationship between the curved surface and parametric space; (3) a step of, by moving the bubbles in parametric space by using an inter-bubble force defined by a predetermined rule, and transforming the bubbles by using transformed tensors, and controlling the number of bubbles, determining stable allocation for the bubbles in parametric space; (4) a step of determining a connection relationship between mesh nodes being centers of the bubbles located in parametric space; (5) a step of generating a mesh on the curved surface by using the positions and the connection relationship of the mesh nodes. The above steps are shown in FIG. 1.

(1) Step of inputting a curved surface to be meshed and a tensor at each point on the curved surface.

Figure 2:
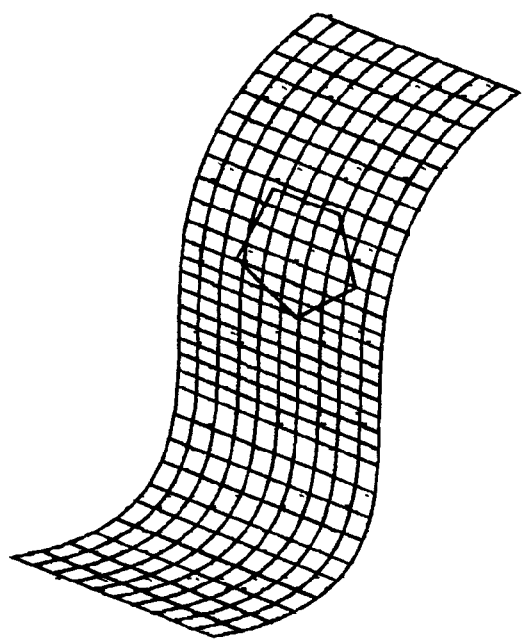
FIG. 2 is a diagram illustrating one example input curved surface.

A trimmed curved surface, for example, is input as a pair of parametric curved surface equations:

$$P(s,t)=[X(s,t), Y(s,t), Z(s,t)]$$

or $$P(s,t)=[X(s,t)/W(s,t), Y(s,t)/W(s,t), Z(s,t)/W(s,t)]$$

and a trimmed domain in parametric space. A curved surface in FIG. 2 is specified as a pair of the above described parametric curved surface equations and a trimmed domain. A curved surface that is not represented by the parametric curved surface equation can be transformed into a parametric curved surface equation.

Figure 3:
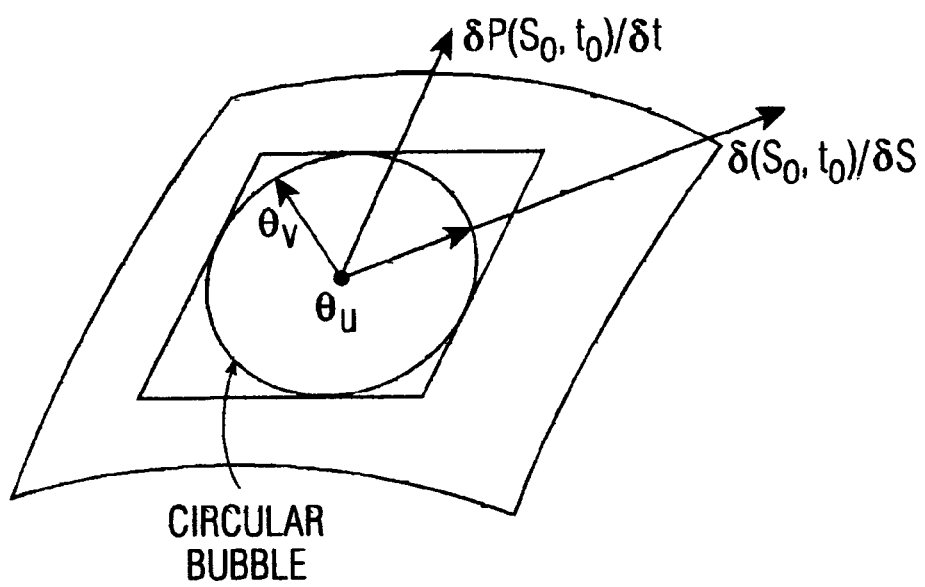
FIG. 3 is a diagram for explaining the correspondence of parametric space and real space.

As for input tensors, assuming the coordinates of two unit vectors $e_u$ and $e_v$ is [u,v] that are vertical each other on a tangent plane at point $P(s_0, t_0)$ on a curved surface, as shown in FIG. 3, a tensor at that point is represented as follows:
[Expression 1]

$$T = \begin{bmatrix} T_{uu} & T_{uv} \\ T_{vu} & T_{vv} \end{bmatrix}$$

(wherein $T_{uv}=T_{vu}$) The value of each element of the tensor has to be designated for each point on the curved surface. A tensor ellipse expressed by such a tensor is $$T_{uu}u^2+T_{vv}v^2+2T_{uv}uv=1,$$

and an elliptic bubble is positioned. In this invention, however, bubbles are not necessarily formed in real space. For example, when circular bubbles with radius r are designated in real space, the tensors are
[Expression 2]

$$T = \begin{bmatrix} \frac{1}{r^2} & 0 \\ 0 & \frac{1}{r^2} \end{bmatrix}$$

(2) Step of generating in parametric space corresponding to a curved surface bubbles that correspond to tensors transformed according to a relationship between the curved surface and parametric space.

Coordinates for two tangent vectors on the tangent plane in FIG. 3, which are represented as
[Expression 3]

$$\frac{\partial P(s_o, t_o)}{\partial s}, \frac{\partial P(s_o, t_o)}{\partial t}$$

are defined as [x, y]. The transformation from two coordinates [x, y] on the tangent plane to [u, v] is represented by the following afine transformation expression:
[Expression 4]

$$\begin{bmatrix} u \\ v \end{bmatrix} = \begin{bmatrix} a & b \\ c & d \end{bmatrix} \begin{bmatrix} x \\ y \end{bmatrix}$$

When tensor transformation is performed for a tensor (expression 1) by using the above described relationship,
[Expression 5]

$$\begin{bmatrix} T_{xx} & T_{xy} \\ T_{yx} & T_{yy} \end{bmatrix} = \begin{bmatrix} a & c \\ b & d \end{bmatrix} \begin{bmatrix} T_{uu} & T_{uv} \\ T_{vv} & T_{vv} \end{bmatrix} \begin{bmatrix} a & b \\ c & d \end{bmatrix}$$

The tensor obtained by the tensor transformation is regarded as a tensor at point $[s_0, t_0]$ in parametric space. A tensor ellipse represented by the tensor is an elliptic (or circular) bubble that is filled at that point in parametric space.

Assuming that, for simplification, the unit vector eu has the same direction as that of the tangent vector on the left side of expression 3, the relationship of the uv coordinate to the xy coordinate is as follows:
[Expression 6]

$$\begin{bmatrix} u \\ v \end{bmatrix} = \begin{bmatrix} \|P_s\| & \cos\theta\|P_t\| \\ 0 & \cos\theta\|P_t\| \end{bmatrix} \begin{bmatrix} x \\ y \end{bmatrix}$$

wherein $\|P_s\|$ and $\|P_t\|$ represent the norm of the tangent vector in expression 3, and $\theta$ represents an angle between the tangent vectors in expression 3. As a result, a, b, c and d in expression 4 can be acquired.

(3) Step of determining stable allocation for bubbles in parametric space by moving the bubbles in parametric space by using inter-bubble force defined by a predetermined rule, and transforming the bubbles by using the transformed tensors, and controlling the number of bubbles.

This step is performed by the execution by the following pseudo-code, for example.

TABLE 1

| | |
|---|---|
| 10: | for (repeat iteration until the maximum bubble moving distance is equal to or less than a threshold value) { |
| 15: |     modified Delaunay triangular division |
| 20: |     /* force calculating portion and bubble moving portion*/ |
| 30: |     for (each bubble) { |
| 40: |         • calculate the sum of the force exerted by adjacent bubbles. |
| 50: |         • move bubbles according to the force. |
| 60: |         • generate a bubble in parametric space at position after the movement by using given tensor field. |
| 70: |     } |
| 80: |     /* bubble addition portion and deletion portion*/ |
| 90: |     for (about each side of a triangle) { |

TABLE 1-continued

| | |
|---|---|
| 100: |         if (side is much longer than sum of radii of bubbles) { |
| 110: |             • add a new bubble at middle point of side. |
| 120: |         } |
| 130: |         if (side is much shorter than sum of radii of bubbles) { |
| 140: |             • delete one bubble at each end of side. |
| 150: |         } |
| 160: |     } |
| 170: | } |

The above pseudo-code will now be explained. The process from line 10 to line 170 is repeated until the maximum bubble moving distance is equal to or less than a threshold value. The bubble moving distance will be described in detail in an explanation for line 50. The threshold value determines how many times the process is repeated. When a small threshold value is set, bubbles are located more stably, even though the process is slow. When a large threshold value is set, the process is fast, and is terminated even when the bubbles are not located stably.

The process of line 10 to line 170 is divided into three portions. The first potion is line 15 in which modified Delaunay triangular division is performed, and the second portion extends from line 20 to line 70 and concerns the calculation of an inter-bubble force and the movement of bubbles. The third portion extends from line 80 to line 160 and is where the addition or deletion of bubbles is performed.

The modified Delaunay triangular division process in line 15, which is the first portion, is the same as "(4) a step of determining a connection relationship between mesh nodes being centers of the bubbles located in parametric space," which will be described later, and a detailed explanation for this process will not be given here. In this process, the centers of bubbles generated in parametric space are connected together according to a predetermined algorithm. The triangular division process is performed only to detect which bubble is adjacent to a specific bubble. If another method can be employed for such a detection, the example process can be replaced by it.

Figure 4A:
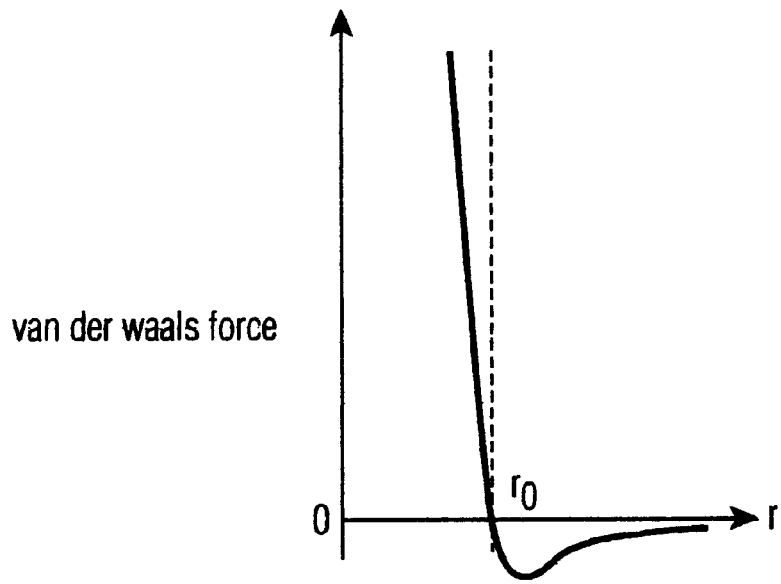
FIGS. 4(a) and (b) are graphs for explaining inter-bubble force.
Figure 4B:
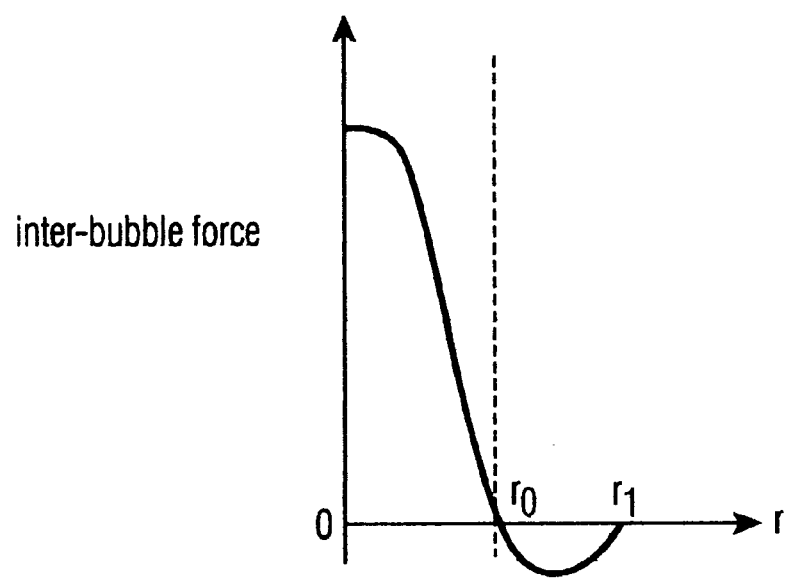

The second portion composed of line 20 to line 70 is further divided into three portions: line 40, line 50 and line 60. In line 40, the sum of the force exerted by adjacent bubbles is calculated for a specific bubble. The bubble has a shape described in the previous step (step (2)), and is a virtual object having mass m. In this embodiment, all of the bubbles have the same mass, but their masses can differ in accordance with their sizes. The force acting on the object is assumed to be either attraction or repulsion, provided by Van der Waals force, which is an inter-molecule force. As shown in FIG. 4(a), Van der Waals force provides attraction at $r_0 < r$, and approaches 0 as r becomes greater. At $0 < r < r_0$, Van der Waals force provides repulsion that increases drastically as r approaches 0. In this invention, as a simulation of this, the inter-bubble force is so defined that when r is located between $r_0$ and $r_1$ it indicates attraction, when $r = r_0$ it is 0, and when $r \leq r_0$ or smaller it indicates repulsion that gradually increases until it reaches a specific finite value (see FIG. 4(b)).

Figure 5A:
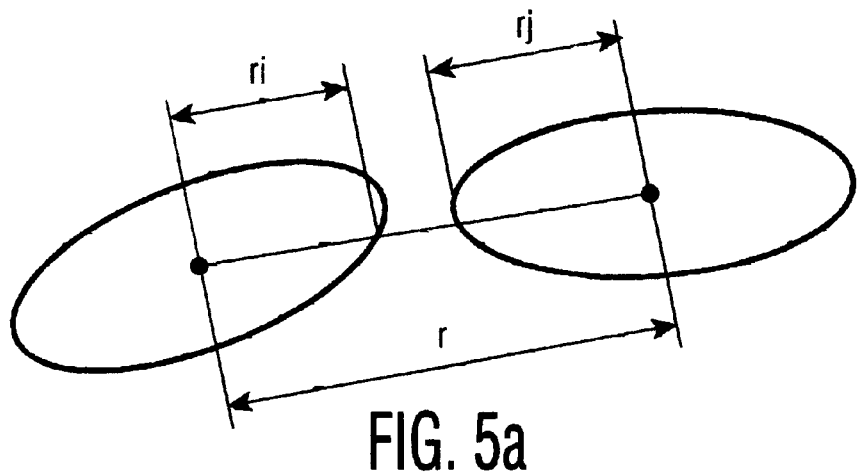
FIGS. 5(a), (b) and (c) are diagrams for explaining the inter-bubble force.
Figure 5B:
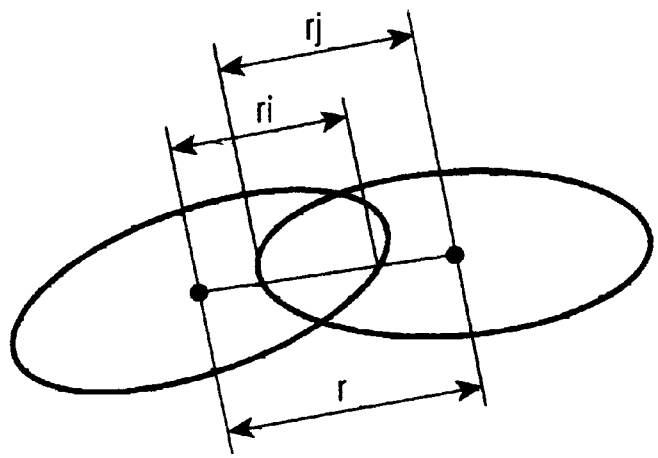
Figure 5C:
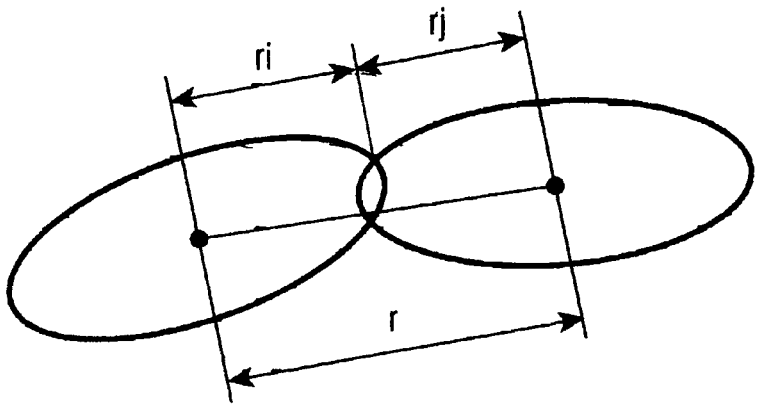

The determination of r and $r_0$ will now be described referring to FIG. 5. First, as shown in FIG. 5(a), a line segment that connects the centers of two elliptic bubbles is employed, its length being defined as r. Then, the intersections of the line segment and the elliptic bubbles are calculated, and the distances from the intersections to the centers of the ellipses are defined as $r_i$ and $r_j$. The sum of the distances, $r_i+r_j$, is compared with the distance r between the centers of the elliptic bubbles. When $r_i+r_j$ is smaller than r, as it is in FIG. 5(a), it is assumed that the two elliptic bubbles are too far from each other, and attraction is specified as the force exerted between two elliptic bubbles. When $r_i+r_j$ is greater than r, as it is in FIG. 5(b), it is assumed that the two elliptic bubbles are too close to each other, and repulsion is specified as the force exerted between the two elliptic bubbles. When $r_i+r_j$ is equal to r, as it is in FIG. 5(c), or when $r_i+r_j$ falls into a predetermined range in which its value is defined as being essentially equal to r, no force is exerted between the two elliptic bubbles. Therefore, it is apparent that r in FIG. 4 should be defined as the distance between the centers of the bubbles in FIG. 5, and $r_0$ in FIG. 4 should be defined as $r_i+r_j$ in FIG. 5.

In FIG. 4, $r_1$ is employed when the inter-bubble force at a longer distance is defined as 0 and the amount of calculations is reduced disregarding an influence given by a bubble located away. The direction of the inter-bubble force is a direction of a straight line that connects the centers of the two bubbles.

In this embodiment the magnitude of the inter-bubble force, f(r). is defined as the following expression.
[Expression 7]

$$f(r) = ar^3 + br^2 + cr + d \qquad 0 \leq r \leq 1.5r_o$$
$$f(r) = O \qquad 1.5r_o < r$$
$$f(r_o)O, f'(0) = O, f(1.5r_{o4}) = O$$
$$f'(r_o) = -k_o$$

wherein $r_1$ is defined as $1.5r_0$. In addition, $r_0=r_i+r_j$ as previously described. Expression 7 does not include a term concerning the mass of the bubble. Therefore, the inter-bubble force is determined by the distance between the bubbles and the radii of the bubbles. $-k_0$ is an elastic coefficient when the inter-bubble force is replaced by a linear spring at a stable distance.

While the inter-bubble force f(r) is not limited to that obtained by expression 7, it can be defined by other expressions that satisfy at least the following conditions.

(1) When r is sufficiently large, f(r) is substantially close to 0. This is because the affect from a bubble far away can be disregarded.

(2) When r is small to a degree, an attraction is provided. This is because bubbles positioned apart from each other are to be moved in a direction that will bring them nearer each other.

(3) When r is still smaller, the force changes to repulsion. This is because a constant distance is provided for bubbles when they are closely packed. Actually, if the only force is attraction, the bubbles will be packed together at one point, and a mesh can not be generated later.

(4) Even when r approaches as near 0 as possible, repulsion does not exceed a constant value. This is because stability of the bubbles is maintained. For example, if the repulsive force drastically increases as r is reduced, as it does for Van der Waals force, the bubbles that have approached each other strongly repulse each other and their positions are not stabilized.

The inter-bubble force is calculated for all the bubbles adjacent to a specific bubble. Whether or not a bubble is adjacent to the specific bubble is determined by determining whether or not the sides of mesh, which is generated by the triangular division, are connected together, as described above. The inter-bubble forces of all the bubbles adjacent to a specified bubble, are added together. The process in line 40 of the pseudo-code in Table 1 is thereafter terminated.

The process in line 50 is a process for actually moving bubbles. For this process, only the distance and the direction the bubbles are to be moved need be specified. Assuming the individual bubbles are regarded as points having mass m (having no moment of inertia), second-order ordinary differential equations are calculated while taking the inter-bubble force and viscosity into account, so that the positions of the bubbles are changed. Newton's equation is represented as follows.
[Expression 8]

$$m_i \frac{d^2 x_i(t)}{dt^2} + C_i \frac{dx_i(t)}{dt} = f_{x_i}(t)$$
$$m_i \frac{d^2 y_i(t)}{dt^2} + C_i \frac{dy_i(t)}{dt} = f_{y_i}(t)$$

wherein $x_i$ denotes coordinate x of an i-th bubble (coordinate x in parametric space); $m_i$ denotes the mass of the i-th bubble; and $y_i$ denotes coordinate y of the i-th bubble (coordinate y in parametric space). The first-order differential term, which takes viscosity into account, includes viscous coefficient $c_i$. The viscous coefficient can be set to a different value for each x and y direction, or can be set to a constant value c. It is known that if the term taking viscosity into account is removed, the vibration of bubbles continues without convergence so that a stable condition can not be attained. $f_{xi}(t)$ and $f_{yi}(t)$ on the right side of expression 8 are the sum of x elements and the sum of y elements of the force that is exerted by adjacent bubbles on the i-th bubble during time t.

In expression 8, time t is increased by $\Delta t$ using a well known numerical analysis method, such as the Runge-Kutta method, for an ordinary differential equation, and the coordinate values for the individual bubbles are calculated. As previously described, since the repeating of the process from line 10 to line 180 of the pseudo-code is determined by ascertaining whether or not a moving distance is equal to or smaller than the threshold value, moving distance ($\Delta x, \Delta y$) is also calculated. As the original coordinate values are already obtained, only the moving distance ($\Delta x, \Delta y$) may be calculated. The numerical analysis method for an ordinary differential equation is not limited to the Runge-Kutta method, and the Adams method and the Euler method may be also employed. See, for example, "Numerical Calculation," Haruo Jonouchi, Science and Engineering Mathematics 15, September 1978, Science Co., Ltd.

Although a process (line 50 of the pseudo-code) for moving bubbles is terminated in the above described manner, the bubbles do not always have a shape that is according to tensors originally provided on the curved surface in real space. That is, before being moved the bubbles have a shape according to the input tensors, but tensors defined at the positions after the bubbles are moved are normally different from those that correspond to the bubbles that have been moved. Thus, in line 60 of the pseudo-code, a process for transforming the shape of bubbles is performed. In the transformation process, actually, bubbles are generated again, so that they correspond to tensors in parametric space, which are defined by their positions after being moved. Since this process is the same as step (2), no further explanation will be given.

The process from line 40 to line 60 of the pseudo-code is performed for all of the bubbles. Through the above processing, the coordinates of the individual bubbles (and/or the distances ($\Delta x$, $\Delta y$)) after minute time $\Delta t$ has elapsed can be obtained.

Following this, an explanation will be given for a process from line 80 to line 160 of the pseudo-code, which is the third portion, concerning the addition or deletion of bubbles. In line 90, the following process is repeated for each side of an individual triangle. This triangle is a triangular mesh generated by the previously mentioned, modified Delaunay triangular division in line 15 of the pseudo-code. Since the bubbles have been moved after the process of line 15 of the pseudo-code, the modified Delaunay triangular division may be arbitrarily performed before the process in line 80. In line 100, a check is performed to determine whether a ratio of the length of the side of a triangle to the sum of the radii of two bubbles, which intersect the side of the triangle, is equal to or smaller than a first threshold value. In other words, a check is performed to determine whether or not there is too large a gap between bubbles. While the sum of the radii can be defined as $r_i+r_j$ in FIG. 5, this is determined from their positions after being moved. When the ratio is equal to or smaller than the first threshold value, one bubble is generated at the midpoint of the side of the triangle (line 110 of the pseudo-code). This generation method is the same as that previously described at step (2).

When the obtained ratio is equal to or greater than a second threshold value (line 130 of the pseudo-code), this means the bubbles are too tightly packed, and one of the bubbles at the ends of the side of the triangle is eliminated (line 140 of the pseudo-code). No process is performed for a side that does not match either condition. In this manner, the number of bubbles can be adaptively controlled.

Although the control of the bubble number by using the side of the triangle has been explained, the present invention is not limited to this method, and, for example, can employ the method proposed in Japanese Unexamined Patent Publication No. Hei 8-315183, which was described in the background explanation.

Figure 6:
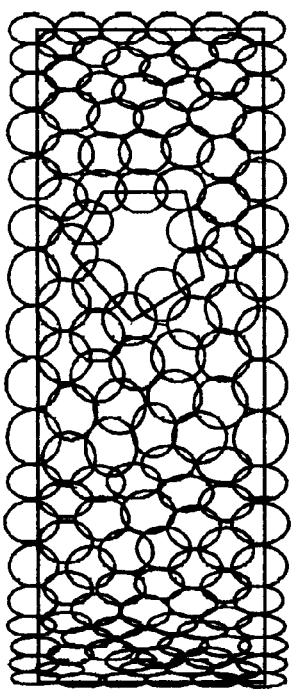
FIG. 6 is a diagram illustrating an example where bubbles are located at stable positions.

When the process returns to line 10, a check is performed to determine whether the maximum bubble moving distance obtained by the process in line 50 exceeds the threshold value. $(\Delta x^2+\Delta y^2)^{0.5}$ may be employed as a moving distance, or simply $|\Delta x|+|\Delta y|$ can be employed. When the maximum moving distance exceeds the threshold value, the process from line 10 to line 170 is performed again. When the maximum moving distance does not exceed the threshold value, it is assumed that the bubbles are located stably and program control moves to the succeeding step (4). FIG. 6 shows an example, for the curved surface shown in FIG. 2, where bubbles are located stably in parametric space.

(4) Step of determining a connection relationship between mesh nodes being center of the bubbles located in parametric space.

Figures 7A, 7B:
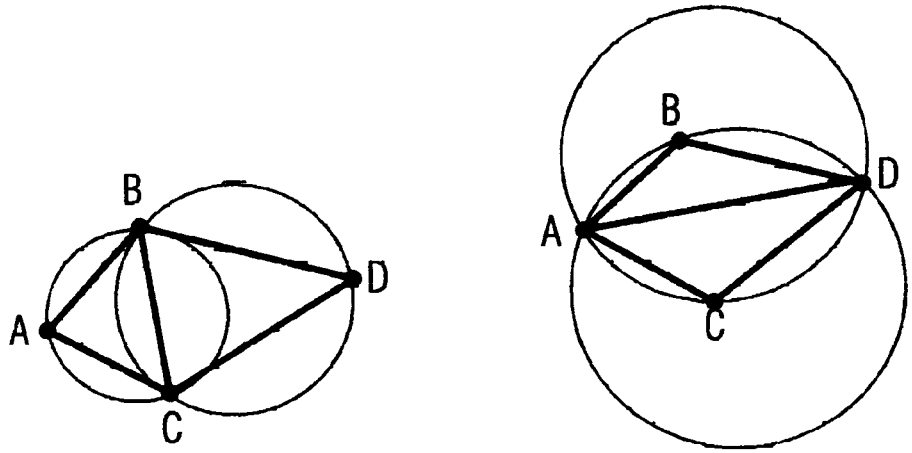
FIGS. 7(a) and (b) are diagrams for explaining normal Delaunay triangular division.

This step is a modified Delaunay triangular division process that has been explained for step (3). In the present invention, the movement of the bubbles is executed in parametric space. Although the process for connecting the centers of bubbles is also to be performed in parametric space, if the normal Delaunay triangular division is performed, desired triangular mesh can not be generated on the curved surface in real space. The normal Delaunay triangular division will be explained referring to FIG. 7. A connection relationship for the centers A, B, C and D of the bubbles in FIG. 7 is determined whether connecting A to D or connecting B to C, by preparing a circumscribed circle for a triangle ADC and a circumscribed circle for a triangle ADB, and a circumscribed circle for a triangle ABC and a circumscribed circle for a triangle BCD, and with the condition that "a point that is not included in a specific triangle is not present inside a circumscribed circle for that triangle." As a result, the meshing is performed by a method for connecting the centers B and C shown in FIG. 7(a). That is, since point B is included inside the circumscribed circle of the triangle ADC, and point C is included in the circumscribed circle of the triangle ADB, the method shown in FIG. 7(b) does not satisfy the above condition. Therefore, the triangular division is performed as is shown in FIG. 7(a).

The triangular division method of the present invention will now be explained referring to FIGS. 8 and 9. First, four bubbles are selected as for the normal Delaunay triangular division (step 110 in FIG. 8 and FIG. 9(a)). Then, the centers of the four bubbles are selected. A bubble is generated at the barycenter for the four centers of the four bubbles (step 120 in FIG. 8 and FIG. 9(b)). The bubble generation is performed in the same manner as in the previously described step (2). Following this, parametric space is expanded or reduced so that the bubble at the barycenter is shaped like a circle, and the coordinates of the centers of the four bubbles are re-calculated (step 130 in FIG. 8 and FIG. 9(c)). There are several ways to expand or reduce parametric space: for example, the length of the short axis of an elliptic bubble at the barycenter can be extended in the short axial direction, so that it is equal to the length of a long axis; the length of the long axis can be reduced in the long axial direction so that it is equal to the length of the short axis; or the extension in the short axial direction may match the reduction in the long axial direction. When the expansion or reduction is performed, the coordinates of the centers of the four bubbles are also changed, and new coordinate values are calculated.

Figure 8:
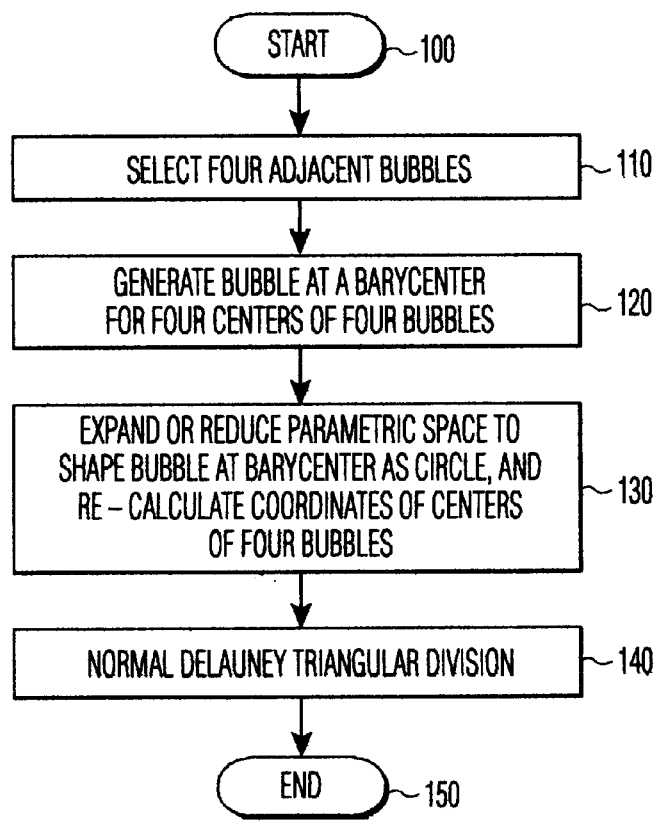
FIG. 8 is a flowchart for modified Delaunay triangular division processing.
Figure 9A:
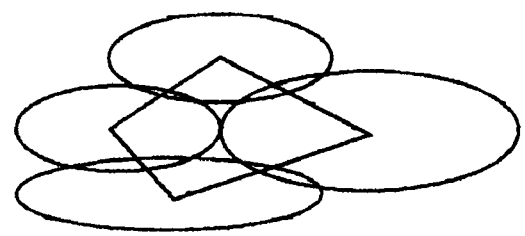
FIGS. 9(a), (b), (c) and (d) are diagrams showing modified Delaunay triangular division examples.
Figure 9B:
Figure 9B:
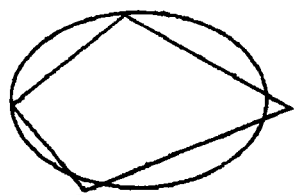
Figure 9C:
Figure 9C:
Figure 9C:
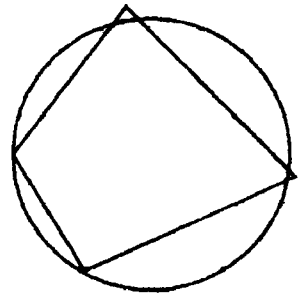
Figure 9D:
Figure 9D:
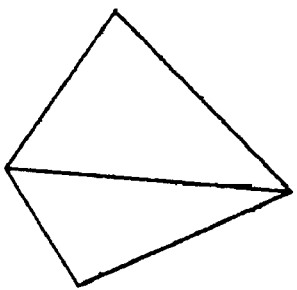
Figure 10:
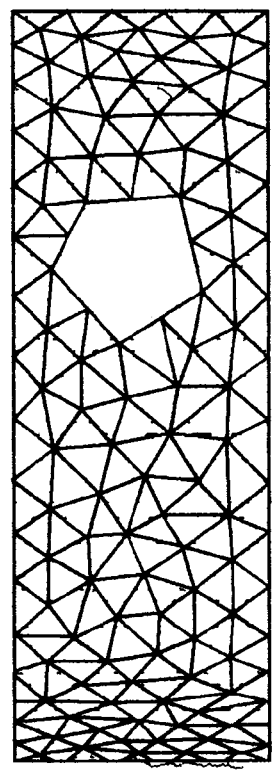
FIG. 10 is a diagram illustrating example triangular division in parametric space.

Then, the normal Delaunay triangular division method for preparing a circumscribed circle by using the newly obtained coordinate values is performed (step 140 in FIG. 8 and FIG. 9(d)). In parametric space, the Delaunay triangular division is performed according to tensors set on the curved surface in real space. FIG. 10 shows the condition where the triangular division is performed for the curved surface in FIG. 2 in parametric space. As apparent from FIG. 10, elongated triangles are also included in parametric space.

(5) Step of generating a mesh on the curved surface by using the positions and the connection relationship of the mesh nodes.

The previously described processes have been performed in parametric space. Data that are actually desired is a mesh on a curved surface in real space. Thus, position data (although the data have been represented by using x and y, x and y may be input to s and t) for mesh nodes, which are acquired in parametric space, are converted into positional information on a curved surface by employing $$P(s,t)=[X(s,t), Y(s,t), Z(s,t)]$$

or $$P(s,t)=[X(s,t)/W(s,t), Y(s,t)/W(s,t), Z(s,t)/W(s,t)].$$

Figure 11:
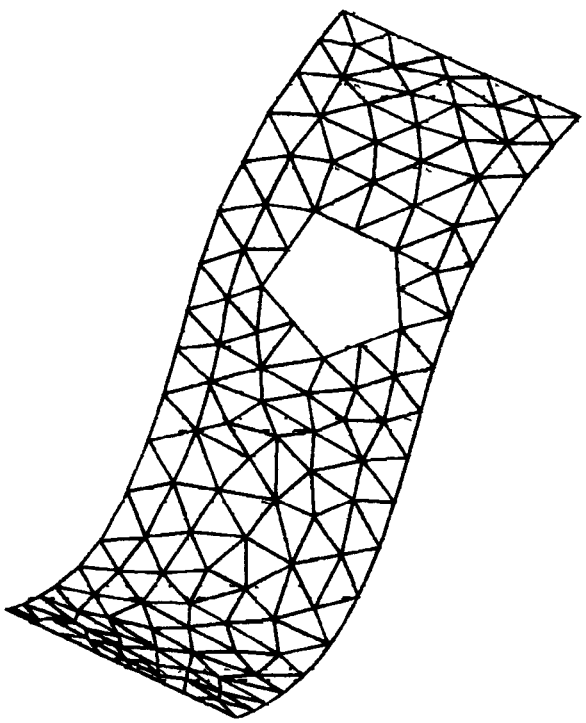
FIG. 11 is a diagram showing an example for meshing a curved surface in real space.

The mesh nodes in parametric space are connected on the curved surface in real space by employing the connection relationship of the mesh nodes in parametric space. As a result of this process, the mesh shown in FIG. 11 is generated on the curved surface. It is apparent from FIG. 11 that the elongated triangles in FIG. 10 are changed until they are nearly equilateral triangles.

The performance of the triangular division has been explained. To generate a square mesh, a square mesh for which tensor fields are taken into account can be generated in parametric space and mapped in real space.

Figure 12:
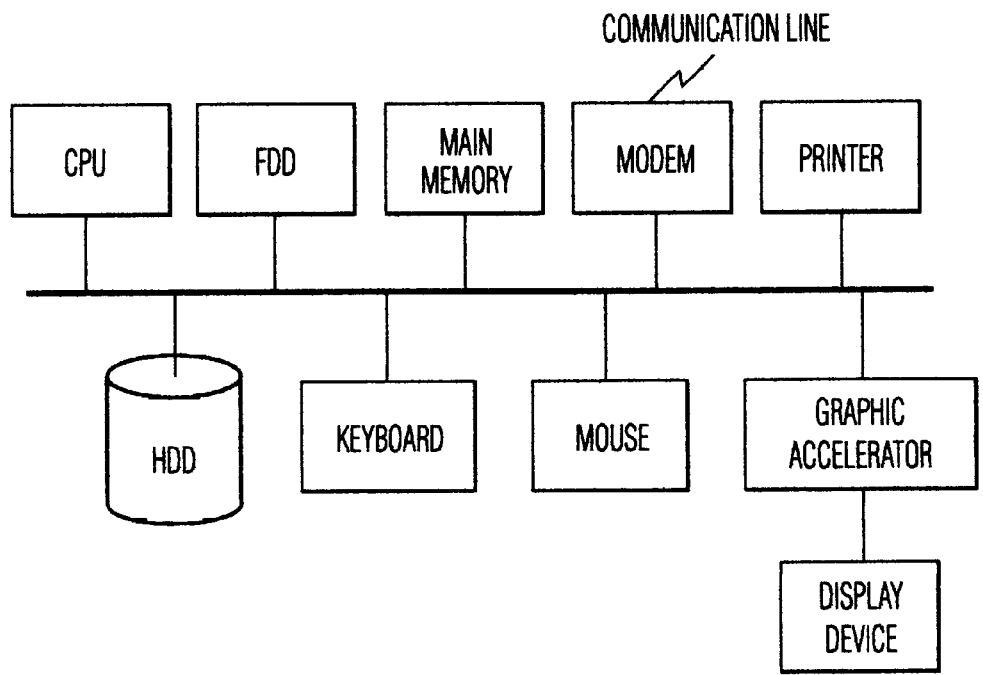
FIG. 12 is a diagram for explaining a common computer system.

The above described processing can be provided as a normal computer program, which can be executed by a computer system shown in FIG. 12. In this case, a computer program and necessary data are stored on a hard disk drive HDD, and are loaded up to a main memory, as needed, and executed by a CPU. The data can be supplied by means of a keyboard, from a floppy disk drive FDD or another storage medium, or across a communication line that is connected to a communication device, such as a modem. The computer program may even be transmitted from another computer system. Similarly, the computer program may be provided on an FD, a CD-ROM or another storage medium. The processing results obtained by the present invention are employed for numerical analysis by another computer program that is stored on the HDD. Further, the processing results can be provided for a user by means of a display device or a printer.

In addition, the present invention can be achieved by a special apparatus. For example, it is possible for modules for performing the respective steps of the processing to be prepared and for data held in the modules to be exchanged to output the final results. Since, in the above embodiment, the triangular division process is repeated many times, a module for performing only the triangular division process can be prepared for common use.

According to the present invention, a method is provided for meshing a curved surface, which satisfies the requirements for:

(1) processing a trimmed curved surface as a meshing target;

(2) processing a complicated curved shape;

(3) controlling a distribution of the size of an element to be generated;

(4) generating triangular elements in a designated shape; and (5) performing automatic processing.

What is claimed is:

1. A method for meshing a curved surface, comprising the steps of:

inputting a curved surface to be meshed;

inputting a tensor at each point on said curved surface, said tensors defining a bubble shape at said each point on said curved surface;

forming a parametric space corresponding to said curved surface, said parametric space having a relationship to said curved surface;

transforming said tensors in accordance with said relationship to form corresponding transformed tensors;

generating bubbles in said parametric space corresponding to at least some of said transformed tensors;

determining stable allocation of said bubbles in said parametric space by moving said bubbles in said parametric space by using inter-bubble force defined by a predetermined rule and controlling the number of said bubbles;

determining a connection relationship of mesh nodes in said parametric space, said mesh nodes being centers of said bubbles allocated in said parametric space; and generating a mesh on said curved surface by using the positions of the mesh nodes and said connection relationship.

2. The method according to claim 1, wherein said stable allocation determining step includes the steps of:

calculating forces exerted in said parametric space by adjacent bubbles to a first bubble, said forces being defined by a predetermined rule;

moving said first bubble in said parametric space in accordance with a sum of the forces exerted by said adjacent bubbles; and generating a second bubble corresponding to one of said transformed tensors at a position in said parametric space opened by said movement of said first bubble.

3. The method according to claim 1, wherein said stable allocation determining step includes the steps of:

generating a new bubble between said bubbles in said parametric space when there is a large enough gap between said bubbles to satisfy a first predetermined condition; and eliminating a first bubble in said parametric space when a first bubble and a second bubble are so close that a second predetermined condition is satisfied.

4. The method according to claim 1, wherein said connection relationship determining step includes the steps of:

selecting four adjacent bubbles in said parametric space;

generating a new bubble corresponding to a transformed tensor at barycenters of four centers of said four bubbles;

transforming said parametric space so that the generated new bubble becomes a circle, and calculating said positions of said centers of said four bubbles in said transformed parametric space; and based on said positions of said centers of said four bubbles in said transformed parametric space, determining how said four centers of said four bubbles are connected.

5. The method according to claim 1, wherein said stable allocation determining step includes the steps of:

selecting four adjacent bubbles in said parametric space;

generating a new bubble corresponding to a transformed tensor at barycenters of four centers of said four bubbles;

transforming said parametric space so that the generated new bubble becomes a circle, and calculating said positions of said centers of said four bubbles in said transformed parametric space; and based on said positions of said centers of said four bubbles in said transformed parametric space, determining how said four centers of said four bubbles are connected.

6. The method according to claim 1, wherein said stable allocation determining step includes the steps of:

generating a new bubble in said parametric space between two of said bubbles when a ratio of a length of a line connecting centers of said two bubbles to a sum of radii of said two bubbles is equal to or greater than a first predetermined value, and eliminating a bubble at either end of said line when said ratio is equal to or less than a second predetermined value.

7. An apparatus for meshing a curved surface comprising:

an input device for inputting a curved surface to be meshed and a tensor at each point on said curved surface, said tensors defining a bubble shape at said each point on said curved surface;

a bubble generator for generating bubbles in a parametric space corresponding to said curved surface, said parametric space having a relationship to said curved surface, each said bubble corresponding to a transformed tensor that has been formed from one of said tensors input by said input device in accordance with the relationship between said curved surface and said parametric space;

a stable allocation determining processor for determining stable allocation of said bubble in said parametric space by moving said bubbles in said parametric space by using inter-bubble force defined by a predetermined rule and controlling the number of said bubbles;

a connection relationship determining processor for determining in said parametric space a connection relationship between mesh nodes being centers of said bubbles allocated in said parametric space; and a mesh generator for generating a mesh on said curved surface by using the positions of said mesh nodes and said connection relationship.

8. The apparatus according to claim 7, wherein said stable allocation determining processor includes:

inter-bubble calculation means for calculating forces exerted in said parametric space by adjacent bubbles to a first bubble, said forces being defined by a predetermined rule, means for moving said first bubble in said parametric space in accordance with a sum of the forces exerted by said adjacent bubbles, and means for generating a second bubble that corresponds to a transformed tensor at a position opened by said movement of said first bubble.

9. The apparatus according to claim 7, wherein said stable allocation determining processor includes:

means for generating a new bubble between said bubbles in said parametric space when there is a large enough gap between said bubbles to satisfy a first predetermined condition, and means for eliminating a first bubble when said first bubble and a second bubble are so close that a second predetermined condition is satisfied.

10. The apparatus according to claim 7, wherein said connection relationship determining processor includes:

means for selecting four adjacent bubbles in said parametric space;

means for generating a new bubble corresponding to a transformed tensor at barycenters of four centers of said four bubbles;

means for transforming said parametric space so that the generated new bubble becomes a circle, and for calculating said positions of said centers of said four bubbles in said transformed parametric space; and means for determining, based on said positions of said centers of said four bubbles in transformed parametric space, how said four centers of said four bubbles are connected.

11. The apparatus according to claim 7, wherein said stable allocation determining processor includes:

means for selecting four adjacent bubbles in said parametric space;

means for generating a new bubble corresponding to a transformed tensor at barycenters of four centers of said four bubbles;

means for transforming said parametric space so that the generated new bubble becomes a circle, and for calculating said positions of said centers of said four bubbles in said transformed parametric space; and means for determining, based on said positions of said centers of said four bubbles in transformed parametric space, how said four centers of said four bubbles are connected.

12. The apparatus according to claim 7, wherein said stable allocation determining processor includes:

means for generating a new bubble in said parametric space between two of said bubbles when a ratio of a length of a line connecting centers of said two bubbles to a sum of radii of said two bubbles is equal to or greater than a first predetermined value, and means for eliminating a bubble at either end of said line when said ratio is equal to or less than a second predetermined value.

13. A memory medium storing a program for enabling a computer system to mesh a curved surface, said program comprising the steps of:

inputting a curved surface to be meshed;

inputting a tensor at each point on said curved surface, said tensors defining a bubble shape at said each point on said curved surface;

forming a parametric space corresponding to said curved surface, said parametric space having a relationship to said curved surface;

transforming said tensors in accordance with said relationship to form corresponding tranformed tensors;

generating bubbles in said parametric space corresponding to at least some of said transformed tensors;

determining stable allocation of said bubbles in said parametric space by moving said bubbles in said parametric space by using inter-bubble force defined by a predetermined rule and transforming said bubbles by using said transformed tensors and controlling the number of said bubbles;

determining a connection relationship of mesh nodes in said parametric space, said mesh nodes being centers of said bubbles allocated in said parametric space; and generating a mesh on said curved surface by using said positions of the mesh nodes and said connection relationship.

14. The memory medium according to claim 13, wherein said stable allocation determining step of said program includes the steps of:

calculating forces exerted by adjacent bubbles to a first bubble, said forces being defined by a predetermined rule, moving said first bubble in said parametric space in accordance with a sum of the forces exerted by said adjacent bubbles, and generating a second bubble corresponding to one of said transformed tensors at position opened by said movement of said first bubble.

15. The memory medium according to claim 13, wherein said stable allocation determining step of said program includes the steps of:

generating a new bubble between said bubbles in said parametric space when there is a large enough gap between said bubbles to satisfy a first predetermined condition, and eliminating a first bubble in said parametric space when a first bubble and a second bubble are so close that a second predetermined condition is satisfied.

16. The memory medium according to claim 13, wherein said connection relationship determining step of said program includes the steps of:

selecting four adjacent bubbles in said parametric space;

generating a new bubble corresponding to a transformed tensor at barycenters of four centers of said four bubbles;

transforming said parametric space so that the generated new bubble becomes a circle, and calculating said positions of said centers of said four bubbles in said transformed parametric space; and based on said positions of said centers of said four bubbles in said transformed parametric space, determining how said four centers of said four bubbles are connected.

* * * * *